United States Patent
Ryu et al.

(10) Patent No.: US 9,413,965 B2
(45) Date of Patent: Aug. 9, 2016

(54) REFERENCE IMAGE AND PREVIEW IMAGE CAPTURING APPARATUS OF MOBILE TERMINAL AND METHOD THEREOF

(75) Inventors: Junghak Ryu, Yongin-Si (KR); Jinseok Choi, Yongin-Si (KR); Kangsan Lee, Yongin-Si (KR); Jongsun Park, Seoul (KR); Hyunbok Park, Suwon-Si (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 13/229,510

(22) Filed: Sep. 9, 2011

(65) Prior Publication Data

US 2012/0099012 A1    Apr. 26, 2012

(30) Foreign Application Priority Data

Oct. 22, 2010  (KR) .......................... 10-2010-0103703

(51) Int. Cl.
*H04N 5/232* (2006.01)

(52) U.S. Cl.
CPC ....... *H04N 5/23293* (2013.01); *H04N 5/23222* (2013.01)

(58) Field of Classification Search
USPC ................................ 348/223.1, 231.1, 231.3, 348/333.01–333.05
See application file for complete search history.

(56) References Cited

U.S. PATENT DOCUMENTS

| | | | |
|---|---|---|---|
| 2005/0168597 A1* | 8/2005 | Fisher et al. | 348/231.3 |
| 2007/0030363 A1* | 2/2007 | Cheatle et al. | 348/239 |
| 2007/0052819 A1* | 3/2007 | Nakao et al. | 348/231.1 |
| 2007/0109429 A1* | 5/2007 | Suzuki et al. | 348/231.99 |
| 2008/0171558 A1 | 7/2008 | Choi et al. | |
| 2008/0231741 A1* | 9/2008 | McIntyre et al. | 348/333.01 |
| 2009/0115855 A1 | 5/2009 | Gotoh et al. | |
| 2009/0175551 A1* | 7/2009 | Thorn | 382/254 |
| 2009/0231441 A1* | 9/2009 | Walker et al. | 348/207.1 |
| 2010/0053371 A1* | 3/2010 | Karimoto | 348/231.3 |
| 2011/0102630 A1* | 5/2011 | Rukes | 348/223.1 |
| 2011/0292221 A1* | 12/2011 | Gu et al. | 348/207.1 |

FOREIGN PATENT DOCUMENTS

| | | |
|---|---|---|
| JP | 2009-49476 A | 3/2009 |
| JP | 2009-118069 A | 5/2009 |
| KR | 10-0672338 B1 | 1/2007 |

* cited by examiner

*Primary Examiner* — Twyler Haskins
*Assistant Examiner* — Akshay Trehan
(74) *Attorney, Agent, or Firm* — Birch, Stewart, Kolasch & Birch, LLP

(57) ABSTRACT

An image capturing apparatus and a method thereof, with the apparatus capable of allowing a user to effectively capture a desired image by a camera by displaying a reference image on a display unit together with an image currently captured by the camera. The apparatus may include a controller configured to acquire a reference image corresponding to a current location when a capturing mode of a camera is selected, and configured to display the acquired reference image on a display unit together with the image captured by the camera.

16 Claims, 7 Drawing Sheets

REFERENCE IMAGE AND PREVIEW IMAGE CAPTURING APPARATUS OF MOBILE TERMINAL AND METHOD THEREOF

CROSS-REFERENCE TO RELATED APPLICATION

Pursuant to 35 U.S.C. §119(a), this application claims the benefit of earlier filing date and right of priority to Korean Application No. 10-2010-0103703, filed on Oct. 22, 2010, the contents of which is incorporated by reference herein in its entirety.

BACKGROUND OF THE INVENTION

1. Field of the Invention

This specification relates to an image capturing apparatus of a mobile terminal and a method thereof.

2. Background of the Invention

Generally, the conventional image capturing apparatus of a mobile terminal is configured to capture still or moving images according to a user's manipulations.

SUMMARY OF THE INVENTION

To achieve these and other advantages and in accordance with the purpose of this specification, as embodied and broadly described herein, there is provided an image capturing apparatus of a mobile terminal, comprising: a camera; a display unit; a location detection unit configured to detect a current location; and a controller configured to acquire a reference image corresponding to the current location when a capturing mode of the camera is selected, configured to capture an image by the camera based on capturing information of the acquired reference image, and configured to display the acquired reference image on the display unit together with the image captured by the camera.

The capturing information may be meta information of the acquired reference image.

The controller may be configured to automatically capture the image by the camera based on one of a size, a resolution, a brightness, a chroma and a focus of the acquired reference image.

The controller may display, on the display unit, the acquired reference image together with a preview image captured by the camera.

The controller may be configured to request a reference image corresponding to the current location from a server through a communication network when a capturing mode of the camera is selected, configured to receive the reference image corresponding to the current location from the server, and configured to display the received reference image on the display unit together with an image currently captured by the camera.

The controller may be configured to read an image corresponding to the current location from a storage unit when a capturing mode of the camera is selected, and configured to display the read image on the display unit together with the image captured by the camera.

The display unit may include a first display and a second display. The controller may display the acquired reference image on the first display, and display the image captured by the camera on the second display.

The controller may divide a display region of the display unit into a first display region and a second display region. Then, the controller may display the acquired reference image on the first display region, and display the image captured by the camera on the second display region.

The location detection unit may be further configured to detect a capturing direction of the camera. Here, the controller may acquire a reference image corresponding to the current location and the capturing direction, and may display the acquired reference image on the display unit together with the image captured by the camera.

The controller may be configured to request a reference image corresponding to the current location and the capturing direction from a server through a communication network when a capturing mode of the camera is selected, configured to receive the reference image corresponding to the current location and the capturing direction from the server, and configured to display the received reference image on the display unit together with the image captured by the camera.

The controller may be configured to read an image corresponding to the current location and the capturing direction from a storage unit when a capturing mode of the camera is selected, and configured to display the read image on the display unit together with the image captured by the camera.

To achieve these and other advantages and in accordance with the purpose of this specification, as embodied and broadly described herein, there is also provided a method for capturing an image by a mobile terminal, the method comprising: detecting a current location; acquiring a reference image corresponding to the current location when a capturing mode of the camera is selected; and displaying the acquired reference image on the display unit together with the image captured by the camera.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, with reference to FIGS. 1 to 9, will be explained an image capturing (photographing) apparatus and a method thereof, the apparatus capable of allowing a user to effectively capture (photograph) a desired image by a camera by displaying a reference image on a display unit together with an image currently captured by the camera.

Figure 1:
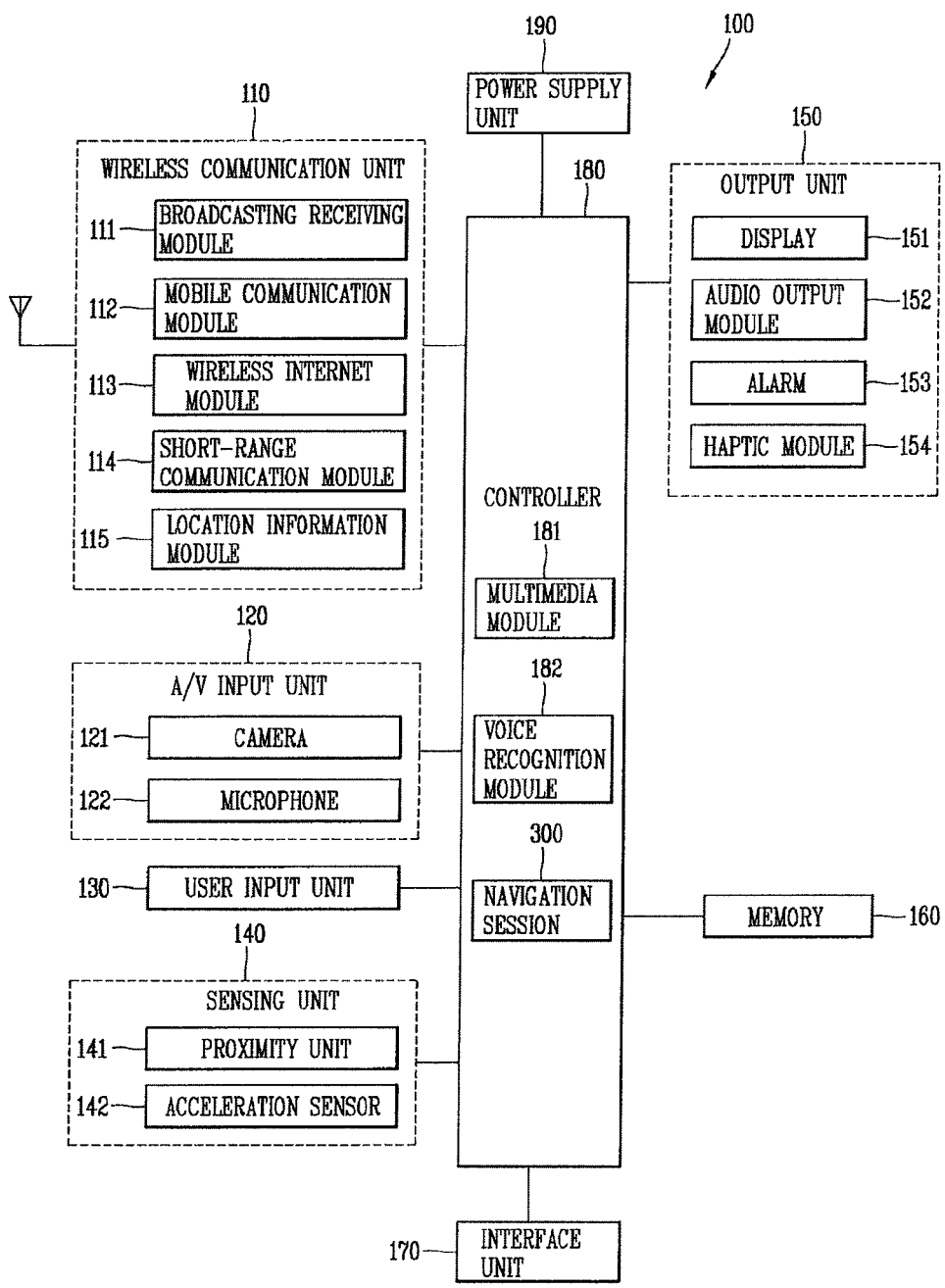
FIG. 1 is a view illustrating a configuration of a mobile terminal to which an image capturing apparatus of the present invention has been applied.

FIG. 1 is a view illustrating a configuration of a mobile terminal 100 to which an image capturing apparatus of the present invention has been applied. The mobile terminal (mobile communication terminal) 100 may be implemented in a various forms such as mobile phones, smart phones, notebook computers, digital broadcast terminals, PDAs (Personal Digital Assistants), PMPs (Portable Multimedia Player), etc.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module 113 may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal (when the mobile terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi positioning system and/or a hybrid positioning system may be used.

The location information module 115 may further include an earth magnetic field sensor for detecting a direction and/or a gravitation sensor. For instance, the location information module 115 detects a direction of the mobile terminal (e.g., the East, West, South and North) for implementation of a navigation using augmented reality through the earth magnetic field sensor (electronic compass). The location information module 115 detects a direction of a gravitation through the gravitation sensor (G sensor). When a user holds the mobile terminal in a vertical direction, the location information module 115 displays a vertical screen. On the other hand, when a user holds the mobile terminal in a horizontal direction, the location information module 115 automatically rotates the screen by 90° to display a horizontal screen. While the user is viewing moving images, the location information module 115 rotates the screen according to a direction of the mobile terminal held by the user, thereby allowing the user to conveniently view the moving images.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capturing device in a video capturing mode or an image capturing mode. The processed image frames may be displayed on a display 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data within the mobile terminal to an external device.

The output unit 150 is configured to provide outputs in a visual, audible, and/or tactile manner (e.g., audio signal, video signal, alarm signal, vibration signal, etc.). The output unit 150 may include the display 151, an audio output module 152, an alarm 153, a haptic module 154, and the like.

The display 151 may display information processed in the mobile terminal 100. For example, when the mobile terminal 100 is in a phone call mode, the display 151 may display a User Interface (UI) or a Graphic User Interface (GUI) associated with a call or other communication (such as text messaging, multimedia file downloading, etc.). When the mobile terminal 100 is in a video call mode or image capturing mode, the display 151 may display a captured image and/or received image, a UI or GUI that shows videos or images and functions related thereto, and the like.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

When the display 151 and the touch pad are overlaid in a layered manner to form a touch screen, the display 151 may function as both an input device and an output device. The touch sensor may have the form of, for example, a touch film, a touch sheet, a touch pad, and the like.

The touch sensor may be configured to convert the pressure applied to a particular portion of the display 151 or a change in capacitance generated at a particular portion of the display 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display 151.

Proximity touch in the present exemplary embodiment refers to recognition of the pointer positioned to be close to the touch screen without being in contact with the touch screen.

A proximity unit 141 may be may be disposed within the mobile terminal covered by the touch screen or near the touch screen. The proximity unit 141 refers to a sensor for detecting the presence or absence of an object that accesses a certain detect surface or an object that exists nearby by using the force of electromagnetism or infrared rays without a mechanical contact. Thus, the proximity unit 141 has a longer life span compared with a contact type sensor, and it can be utilized for various purposes.

The example of the proximity unit 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity unit 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The sensing unit 140 may include an acceleration sensor 142. The acceleration sensor 142, an element for converting a change in acceleration in one direction into an electrical signal, is widely used in line with the development of a microelectromechanical system (MEMS) technique. The acceleration sensor 142 includes various types of sensors: an acceleration sensor installed in an air-bag system of a vehicle to measure a great value of acceleration used for detecting a collision, an acceleration sensor for recognizing a fine operation of a user's hand so as to be used as an input unit for games, or the like. The acceleration sensor 142 is configured such that two axes or three axes are mounted on a single package, and only a Z axis may be required according to a usage environment. Thus, when an X-axis directional acceleration sensor or a Y-axis directional acceleration sensor is to be used for a certain reason, a separate piece substrate may be used and the acceleration sensor may be mounted on a main substrate.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm 153 outputs a signal for informing about an occurrence of an event of the mobile terminal 100. Events generated in the mobile terminal may include call signal reception, message reception, key signal inputs, and the like. In addition to video or audio signals, the alarm 153 may output signals in a different manner, for example, to inform about an occurrence of an event. For example, the alarm 153 may output a signal in the form of vibration. When a call signal is received or a message is received, the alarm 153 may vibrate the mobile terminal through a vibration means. Or, when a key signal is inputted, the alarm 153 may vibrate the mobile terminal 100 through a vibration means as a feedback with respect to the key signal input. Through the vibration, the user may recognize the occurrence of an event. A signal for notifying about the occurrence of an event may be output to the display 151 or to the voice output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module 182 recognizes a voice pronounced by the user and performs a corresponding function according to the recognized voice signal.

A navigation session 300 applied to the mobile terminal 100 displays a travel path on map data.

An image capturing apparatus applied to the mobile terminal 100 according to the present invention comprises a camera, a display unit, a location detection unit configured to detect a current location, and a controller configured to acquire a reference image corresponding to the current location when a capturing mode of the camera is selected, and configured to display the acquired reference image on the display unit together with an image currently captured by the camera.

Components of the image capturing apparatus applied to the mobile terminal 100 according to the present invention will be explained in more details with reference to FIGS. 3 to 9.

Hereinafter, a configuration of a telematics terminal 200 to which the image capturing apparatus of the present invention has been applied will be explained with reference to FIG. 2.

Figure 2:
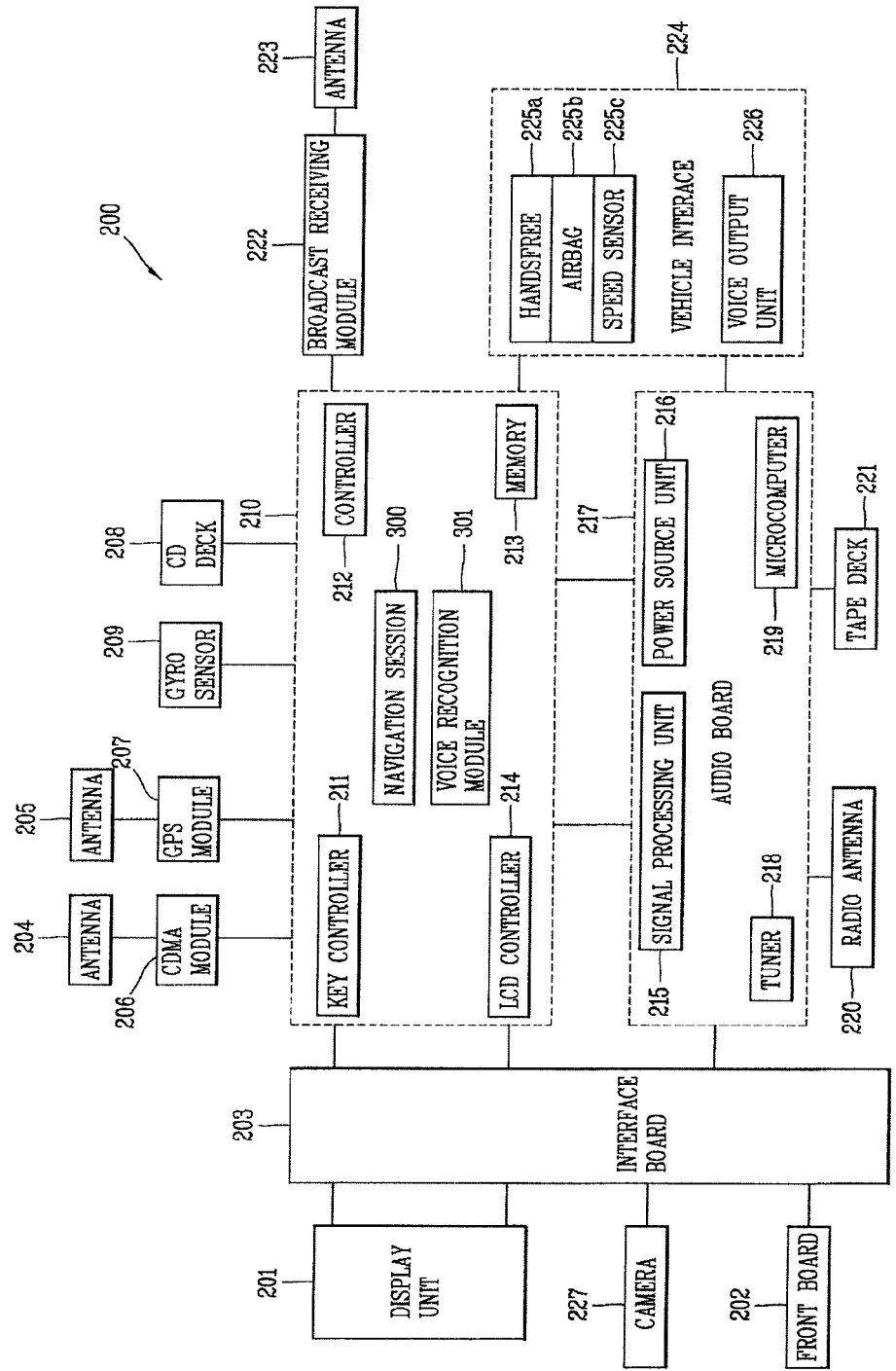
FIG. 2 is a view illustrating a configuration of a telematics terminal to which an image capturing apparatus of the present invention has been applied.

FIG. 2 is a view illustrating a configuration of the telematics terminal 200 to which the image capturing apparatus of the present invention has been applied.

As illustrated in FIG. 2, the telematics terminal 200 may include a main board 210 having therein a controller (a.k.a., central processing unit (CPU)) 212 for performing an overall control of the telematics terminal 200, a memory 213 for storing a variety of information, a key controller 211 for controlling a variety of key signals, and an LCD controller 214 for controlling an liquid crystal display device (LCD).

The memory 213 stores map information (e.g., map data) for displaying road guide information on a digital map. In addition, the memory 213 stores information for an algorithm of controlling traffic information collection to allow an input of traffic information depending on a road condition in which a vehicle is currently traveling, and for controlling the algorithm.

The main board 210 may include or interface with a code division multiple access (CDMA) module 206 serving as a mobile communication terminal built in a vehicle which is given with a unique device number, a GPS module 207 for receiving a GPS signal to guide a location of a vehicle, track a traveling path from a departure to a destination, etc., and for transmitting traffic information collected by the user as a global positioning system (GPS) signal, a CD deck 208 for reproducing a signal recorded on a compact disk (CD), a gyro sensor 209, and the like. The CDMA module 206 and the GPS module 207 are configured to transmit and receive a signal through antennas 204 and 205.

In addition, a broadcast receiving module 222 is connected to the main board 210 and receives broadcast signals through the antenna 223. The main board 210 is connected via an interface board 203 to a display unit (e.g., LCD) 201 controlled by the LCD controller 214, a front board 202 controlled by a key controller 211, and a camera 227 for capturing an inside and/or outside of the vehicle. The display unit 201 displays a variety of video signals and text signals, and the front board 202 is provided with buttons for allowing an input of a variety of key signals so as to provide a key signal corresponding to a button selected by the user to the main board 210. In addition, the display unit 201 includes a proximity sensor and a touch sensor (touch screen).

The front board 202 is provided with a menu key for allowing a direct input of traffic information, and the menu key may be configured to be controlled by the key controller 211.

The audio board 217 is connected to the main board 210 and processes a variety of audio signals. The audio board 217 may include a microcomputer 219 for controlling the audio board 217, a tuner 218 for receiving a radio signal, a power source unit 216 for supplying power to the microcomputer 219, and a signal processing unit 215 for processing a variety of voice signals.

In addition, the audio board 217 is configured to have a radio antenna 220 for receiving a radio signal and a tape deck 221 for reproducing an audio tape. The audio board 217 may further include a voice output unit (e.g., audio amplifier) 226 for outputting a voice or other audio signal processed by the audio board 217.

The voice output unit (e.g., amplifier) 226 is connected to a vehicle interface 224. In other words, the audio board 217 and the main board 210 are connected to the vehicle interface 224. A hands-free 225a unit for inputting a voice signal, an airbag 225b for passenger safety, a speed sensor 225c for detecting a vehicle speed and the like may be connected to the vehicle interface 224. The speed sensor 225c calculates a vehicle speed, and provides the calculated vehicle speed information to the controller 212.

Meanwhile, the mobile vehicle navigation apparatus 300 applied to the telematics terminal 200 generates road guide information based on map data and current vehicle location information, and notifies the generated road guide information to the user.

The display unit 201 senses a proximity touch within the display window through a proximity sensor. For example, when a pointer (for example, finger or stylus pen) is proximity-touched, the display unit 201 detects the position of the proximity touch, and outputs position information corresponding to the detected position to the controller 212.

The voice recognition device (or voice recognition module) 301 recognizes a voice uttered by a user, and performs a relevant function based on the recognized voice signal.

A navigation session 300 applied to the telematics terminal 200 displays a current location and a travel path on data map.

An image capturing apparatus applied to the telematics terminal 200 according to the present invention comprises a camera, a display unit, a location detection unit configured to detect a current location, and a controller configured to acquire a reference image corresponding to the current location when a capturing mode of the camera is selected, configured to capture an image corresponding to the current location, and configured to display the acquired reference image on the display unit together with the image captured by the camera.

Components of the image capturing apparatus applied to the telematics terminal 200 according to the present invention will be explained in more details with reference to FIGS. 3 to 9.

Hereinafter, the image capturing apparatus and the method thereof according to the first embodiment of the present invention will be explained with reference to FIGS. 3 to 5. The image capturing apparatus and the method thereof according to the present invention may be applicable to various terminals such as a smart phone, a notebook computer, a personal digital assistant (PDA), a portable multimedia player (PMP), and the like, as well as the mobile terminal 100, the telematics terminal 200 and a navigation device.

Figure 3:
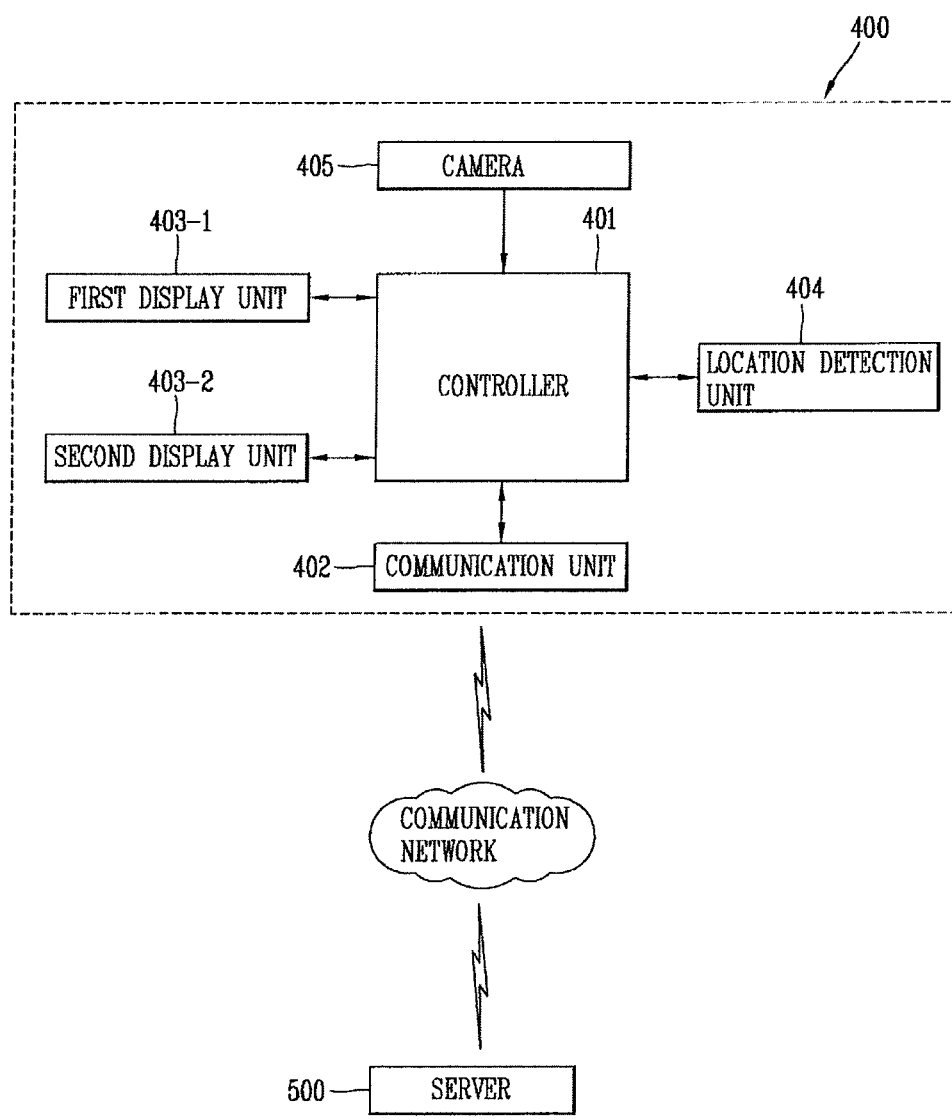
FIG. 3 is a view illustrating an image capturing apparatus of a mobile terminal according to a first embodiment of the present invention.

FIG. 3 is a view illustrating an image capturing apparatus of a mobile terminal according to a first embodiment of the present invention.

As shown in FIG. 3, the image capturing apparatus 400 of a mobile terminal according to a first embodiment of the present invention comprises a camera 405, a first display 403-1 and a second display 403-2, a location detection unit 404 configured to detect current location information (e.g., GPS information), and a controller 401 configured to display an image corresponding to the current location (e.g., reference image) and an image captured by the camera 405 (e.g., preview image) on the first display 403-1 and the second display 403-2, respectively when a capturing mode of the camera is selected. More concretely, in the image capturing apparatus and the method thereof according to the present invention, a user may capture a desired image by comparing a reference image a preview image with each other.

The controller may be configured to request a reference image corresponding to the current location from a server through a communication network when a capturing mode of the camera is selected, configured to receive the reference image corresponding to the current location from the server, and configured to display the received reference image on the display unit together with an image currently captured by the camera.

The image capturing apparatus 400 of a mobile terminal according to the first embodiment of the present invention may further comprise a communication unit 402 configured to request a reference image corresponding to the current location from a server 500 through a communication network when a capturing mode of the camera 405 is selected, configured to receive the reference image corresponding to the current location from the server 500, and configured to output the received reference image to the controller 401.

The image capturing apparatus 400 of a mobile terminal according to the first embodiment of the present invention may further comprise a storage unit (not shown) configured to store therein programs, data, images having capture positions recorded thereon, etc.

Figure 4:
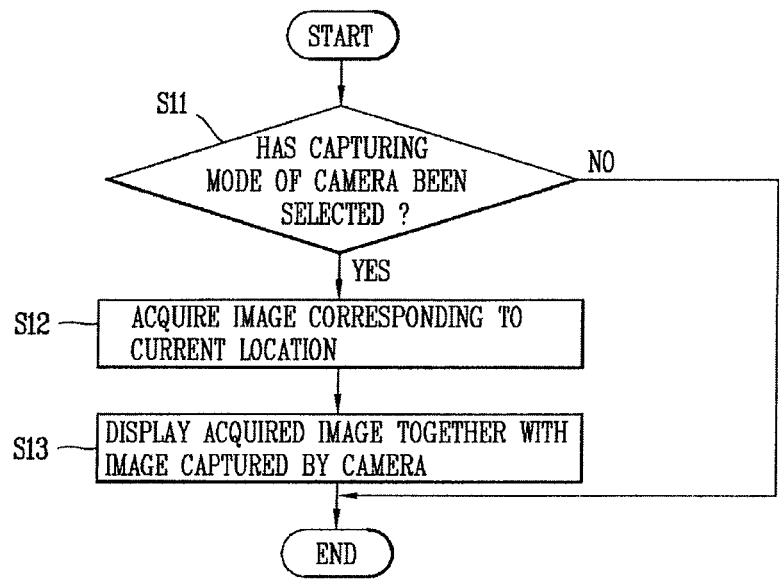
FIG. 4 is a flowchart illustrating processes for capturing an image by a mobile terminal according to the first embodiment of the present invention.

FIG. 4 is a flowchart illustrating processes for capturing an image by the mobile terminal according to the first embodiment of the present invention.

Firstly, the controller 401 determines whether a capturing mode of the camera 405 has been selected by a user (S11). More concretely, the controller 401 determines whether an input (e.g., an icon, a key, etc.) for selecting a capturing mode of the camera 405 has been selected by a user. Alternatively, the controller 401 determines whether a user's preset voice (e.g., a user's utterance of 'capture') for selecting a capturing mode of the camera 405 has been input.

The controller 401 detects a current location through the location detection unit 404 when a capturing mode of the camera 405 is selected by a user, and receives an image corresponding to the detected current location (e.g., reference image) (S12). For instance, the controller 401 detects current location information through the location detection unit 404 when a capturing mode of the camera 405 is selected by a user, requests an image corresponding to the detected current location information (e.g., reference image) from the server 500 through the communication unit 402, and receives the reference image corresponding to the detected current location information from the server 500. Alternatively, the controller 401 may detect current location information through the location detection unit 404 when a capturing mode of the camera 405 is selected by a user, and may search and read an image corresponding to the detected current location information (e.g., reference image) from the storage unit. The image corresponding to the current location indicates an image captured from a current location, which means an image including information on capture position.

The controller 401 is configured to display an image corresponding to the current location (e.g., reference image) and an image captured by the camera 405 (e.g., preview image) on the first display 403-1 and the second display 403-2, respectively (S13). For instance, the controller 401 may display an image corresponding to the current location (e.g., reference image) on the first display 403-1, and may display an image captured by the camera 405 (e.g., preview image) on the second display 403-2. That is, a user may capture an image similar to or same as the reference image displayed on the first display unit, by controlling a capturing direction of the preview image displayed on the second display 403-2 while viewing the image displayed on the first display 403-1. The controller 401 may display direction information to provide the user with distance and/or angle information to guide the user to a capture location and/or capture altitude/height of the reference image.

Figure 5:
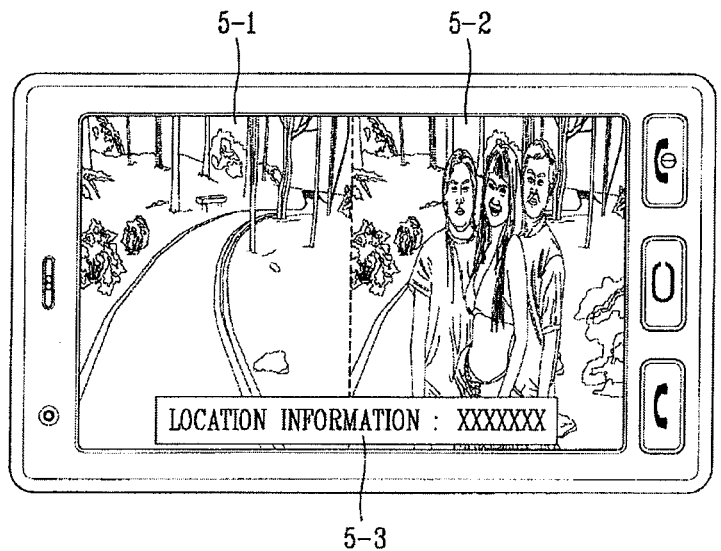
FIG. 5 is an exemplary view illustrating a reference image and a preview image displayed on a display unit according to a first embodiment of the present invention.

FIG. 5 is an exemplary view illustrating a reference image and a preview image displayed on the display unit according to the first embodiment of the present invention.

As shown in FIG. 5, the controller 401 displays an image 5-1 corresponding to the current location (e.g., reference image) on the first display 403-1, and displays an image 5-2 captured by the camera 405 (e.g., preview image) on the second display 403-2. The controller 401 may display current location information 5-3 on the first display unit and/or the second display unit (or on the reference image and/or the preview image). The current location information may be location information of the reference image or location information that compares a location/altitude of the preview image to a location/altitude of the reference image (e.g., a distance and/or direction between the location/altitude of the preview image and the location/altitude of the reference image.)

When there are a plurality of images corresponding to the current location, the controller 401 may display, on the first display 403-1, only an image selected from the plurality of images by a user, as the reference image. The plurality of images may be displayed as thumbnails, with the reference image selected from the thumbnails by the user. Alternatively, the controller 401 may display full screen images of the plurality of images. Via the touch screen or another input device, the user may be able to scroll, pan or otherwise search the plurality of images, and then select one of the plurality of images as the reference image.

The controller 401 may automatically capture the image by the camera 405, based on capturing information of the acquired reference image. For instance, may automatically capture the image by the camera 405 based on a location match between the reference image and the preview image. Alternatively or additionally, the controller 401 may automatically capture the image by the camera 405, based on at least one of a size, a resolution, a bit depth, a color mode, a color profile, a brightness, a chroma and a focus of the acquired reference image. More concretely, the controller 401 may capture, by the camera 405, an image having the same capturing information as the capturing information of the acquired reference image, by automatically setting a capturing menu in the same manner as the capturing information of the acquired reference image.

The capturing information may be meta information about the acquired reference image. For instance, the controller 401 may automatically capture the image by the camera 405, based on at least one of meta information of the acquired reference image. That is, the controller 401 may capture, by the camera 405, an image having the same meta information as the meta information of the acquired reference image, by automatically setting a capturing mode or menu in the same manner as the meta information of the acquired reference image.

In the image capturing apparatus and the method thereof according to the first embodiment of the present invention, a user may effectively capture a desired image by the camera with simultaneously viewing a reference image corresponding to a current location and a preview image captured by the camera. More concretely, the user may capture a portrait at the same position as the reference image with viewing the reference image (e.g., background photo).

The display unit may be implemented as two or more display units (e.g., liquid crystal displays: LCD), or may be implemented as one display unit.

Hereinafter, with reference to FIGS. 6 and 7, will be explained an image capturing apparatus of a mobile terminal and a method thereof according to a second embodiment of the present invention.

Figure 6:
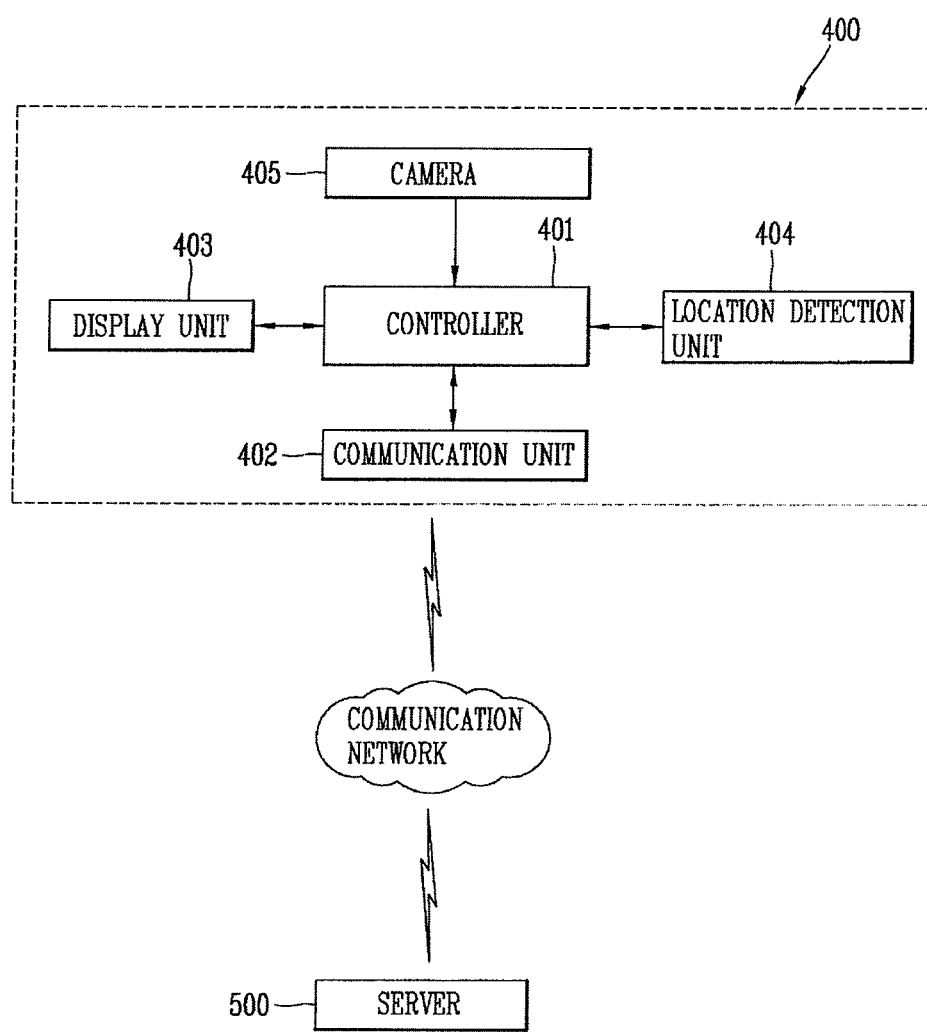
FIG. 6 is a view illustrating an image capturing apparatus of a mobile terminal according to a second embodiment of the present invention.

FIG. 6 is a view illustrating an image capturing apparatus of a mobile terminal according to the second embodiment of the present invention.

As shown in FIG. 6, the image capturing apparatus of a mobile terminal according to a second embodiment of the present invention comprises a camera 405, a display unit 403, a location detection unit 404 configured to detect current location information (e.g., GPS information), and a controller 401 configured to display an image corresponding to the current location (e.g., reference image) and an image captured by the camera 405 (e.g., preview image) on the display unit 403 when a capturing mode of the camera 405 is selected.

Figure 7:
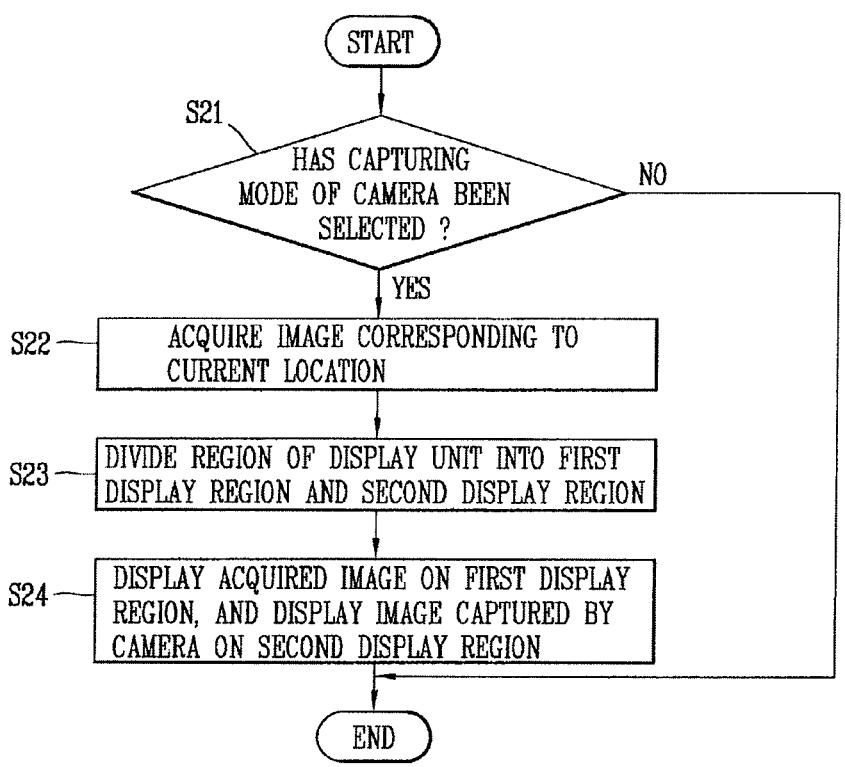
FIG. 7 is a flowchart illustrating processes for capturing an image by a mobile terminal according to the second embodiment of the present invention.

FIG. 7 is a flowchart illustrating processes for capturing an image by a mobile terminal according to the second embodiment of the present invention.

Firstly, the controller 401 determines whether a capturing mode of the camera 405 has been selected by a user (S21). More concretely, the controller 401 determines whether an input (e.g., an icon, a key, etc.) for selecting a capturing mode of the camera 405 has been selected by a user. Alternatively, the controller 401 determines whether a user's preset voice (e.g., a user's utterance of 'capture' or 'camera') for selecting a capturing mode of the camera 405 has been input.

The controller 401 detects a current location through the location detection unit 404 when a capturing mode of the camera 405 is selected by a user, and receives an image corresponding to the detected current location (e.g., reference image) (S22). For instance, the controller 401 detects current location information through the location detection unit 404 when a capturing mode of the camera 405 is selected by a user, requests an image corresponding to the detected current location information (e.g., reference image) from the server 500 through the communication unit 402, and receives the reference image corresponding to the detected current location information from the server 500. Alternatively, the controller 401 may detect current location information through the location detection unit 404 when a capturing mode of the camera 405 is selected by a user, and may search and read an image corresponding to the detected current location information (e.g., reference image) from the storage unit.

The controller 401 divides an entire region of the display unit 403 (S23). For instance, the controller 401 divides the entire region of the display unit 403 into a first display region and a second display region. Alternatively, the controller 401 may divide the entire region of the display unit 403 into two or more display regions.

The controller 401 is configured to display an image corresponding to the current location (e.g., reference image) on the first display region, and to display an image captured by the camera 405 (e.g., preview image) on the second display region (S24). For instance, in an assumption that the display unit 403 is implemented as one liquid crystal display (LCD), the controller 401 divides an entire region of the LCD into a first display region and a second display region. Then, the controller 401 displays an image corresponding to the current location (e.g., reference image) on the first display region, and displays an image captured by the camera 405 (e.g., preview image) on the second display region. That is, a user may capture an image similar to or same as the reference image displayed on the first display region, by controlling a capturing direction of the preview image displayed on the second display region while viewing the image displayed on the first display region.

The controller 401 may display current location information 5-3 on the display unit 403 (or on the reference image and/or the preview image).

In the image capturing apparatus and the method thereof according to the second embodiment of the present invention, the entire region of the display unit is divided into the first display region and the second display region. Then, a reference image corresponding to a current location is displayed on the first display region, and a preview image captured by the camera is displayed on the second display region. This may allow a user to capture a desired image by the camera with simultaneously viewing the reference image and the preview image.

Hereinafter, with reference to FIGS. 6, 8 and 9, will be explained an image capturing apparatus of a mobile terminal and a method thereof according to a third embodiment of the present invention.

Figure 8:
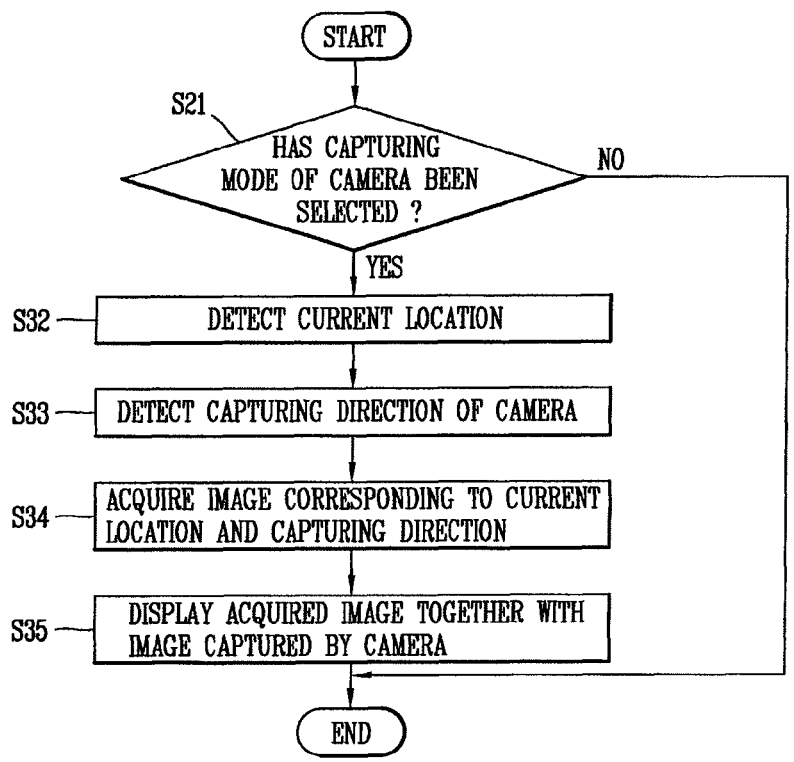
FIG. 8 is a flowchart illustrating processes for capturing an image by a mobile terminal according to a third embodiment of the present invention.

FIG. 8 is a view illustrating an image capturing method by a mobile terminal according to a third embodiment of the present invention.

Firstly, the controller 401 determines whether a capturing mode of the camera 405 has been selected by a user (S31). More concretely, the controller 401 determines whether an input (e.g., an icon, a key, etc.) for selecting a capturing mode of the camera 405 has been selected by a user. Alternatively, the controller 401 determines whether a user's preset voice (e.g., a user's utterance of 'capture') for selecting a capturing mode of the camera 405 has been input.

The controller 401 detects current location information through the location detection unit 404 when a capturing mode of the camera 405 is selected by a user (S32).

The controller 401 detects a capturing direction of the camera 405 through the location detection unit 404 when a capturing mode of the camera 405 is selected by a user (S33). For instance, the location detection unit 404 may include an earth magnetic field sensor (electronic compass), and may detect a capturing direction of the camera 405 through the earth magnetic field sensor or based on information on an installation position of the camera 405.

The controller 401 acquires (receives) an image (e.g., reference image) corresponding to the detected current location (location information) and the capturing direction (S34). For instance, the controller 401 detects current location information through the location detection unit 404 and a capturing direction of the camera 405 when a capturing mode of the camera 405 is selected by a user. Then, the controller 401 requests an image matching the detected current location information and the capturing direction (e.g., reference image), from the server 500, through the communication unit 402. Then, the controller receives, from the server 500, the reference image corresponding to the detected current location information and the capturing direction. Alternatively, the controller 401 may detect current location information through the location detection unit 404 and a capturing direction of the camera 405 when a capturing mode of the camera 405 is selected by a user. Then, the controller 401 may read, from the storage unit, an image corresponding to the detected current location information and the capturing direction (e.g., reference image). The image corresponding to the current location and the capturing direction indicates an image captured from the current location and the current capturing direction, which means an image including information on a capturing location and a capturing direction.

The controller 401 is configured to display an image corresponding to the current location (e.g., reference image) on the display unit 403, together with an image captured by the camera 405 (e.g., preview image) (S35). For instance, in an assumption that the display unit 403 includes a first display (LCD) and a second display (LCD), the controller 401 may display an image corresponding to the current location (e.g., reference image) on the first display and may display an image captured by the camera 405 (e.g., preview image) on the second display. Alternatively, in an assumption that the display unit 403 is implemented as one liquid crystal display (LCD), the controller 401 may divide an entire region of the LCD into a first display region and a second display region. Then, the controller 401 may display an image corresponding to the current location (e.g., reference image) on the first display region, and may display an image captured by the camera 405 (e.g., preview image) on the second display region. That is, a user may capture an image similar to or same as the reference image displayed on the first display region, by controlling a capturing direction of the preview image displayed on the second display region while viewing the image displayed on the first display region.

Figure 9:
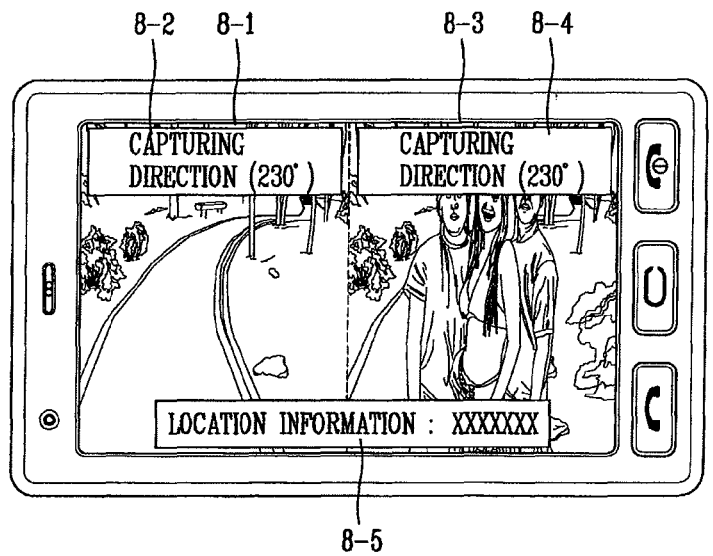
FIG. 9 is an exemplary view illustrating a reference image and a preview image displayed on a display unit according to the third embodiment of the present invention.

FIG. 9 is an exemplary view illustrating a reference image and a preview image displayed on a display unit according to the third embodiment of the present invention.

As shown in FIG. 9, in an assumption that the display unit 403 includes a first display 8-1 and a second display 8-3, the controller 401 displays an image corresponding to the current location and the current capturing direction (e.g., reference image) on the first display 8-1, and displays an image captured by the camera 405 (e.g., preview image) on the second display 8-3. The controller 401 may display current location information 8-5 on the first display and/or the second display (or on the reference image and/or the preview image).

The controller 401 may real-time display, on the second display 8-3, an image captured by the camera 405 (e.g., preview image) together with a capturing direction 8-4 changed by a user.

In the image capturing apparatus and the method thereof according to the third embodiment of the present invention, a reference image corresponding to the current location and the current capturing direction is displayed on the display unit, together with a preview image captured by the camera. This may allow a user to easily and rapidly capture, by the camera, an image similar to or same as the reference image while simultaneously viewing the reference image and the preview image.

As aforementioned, in the image capturing apparatus and the method thereof according to an embodiment of the present invention, a reference image corresponding to the current location is displayed on the display unit, together with a preview image captured by the camera. This may allow a user to capture, by the camera, a desired image while simultaneously viewing the reference image and the preview image.

In the image capturing apparatus and the method thereof according to an embodiment of the present invention, a reference image corresponding to the current location is acquired, and an image is captured by the camera based on capturing information of the acquired reference image. This may allow a user to capture an image similar to or same as the reference image.

In the image capturing apparatus and the method thereof according to an embodiment of the present invention, a display region of the display unit is divided into a first display region and a second display region. Then, a reference image corresponding to the current location is displayed on the first display region, and a preview image captured by the camera is displayed on the second display region. This may allow a user to capture a desired image by the camera while simultaneously viewing the reference image and the preview image.

In the image capturing apparatus and the method thereof according to an embodiment of the present invention, a reference image corresponding to the current location and the current capturing direction is displayed on the display unit, together with a preview image captured by the camera. This may allow a user to easily and rapidly capture, by the camera, an image similar to or same as the reference image while simultaneously viewing the reference image and the preview image.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a camera;
   a display unit;
   an input unit;
   a wireless communication unit;
   a location detection unit configured to detect a current location of the mobile terminal;
   a direction detection unit configured to detect a current capturing direction of the camera; and
   a controller configured to:
     request, based on the detected current location and the detected current capturing direction, images previously captured on the detected current location and the detected current capturing direction of the mobile terminal from a server through the wireless communication unit when an input requesting the images is received through the input unit,
     receive, from the server through the wireless communication unit, the requested images,
     divide a display region of the display unit into first and second display regions when the requested images are received from the server,
     select one of the received images,
     display the selected image on the divided first display region,
     display, on the divided second display region, a preview image being captured at the detected current location and the detected current capturing direction by the camera when the selected image is displayed on the divided first display region,
     display a first capturing direction of the selected image on the divided first display region,
     display the current capturing direction of the camera on the divided second display region,
     display the current location of the mobile terminal on the divided first display region and the divided second display region if a capturing location of the selected image matches the current location of the mobile terminal, and
     automatically capture an image corresponding to the preview image when the first capturing direction and the capturing location match the current capturing direction and the current location of the mobile terminal.

2. The mobile terminal of claim 1,
   wherein the display unit includes a touch screen, and
   wherein the input requesting the images comprises a touch to the touch screen.

3. The mobile terminal of claim 1, wherein the controller is further configured to:
   display a sequence of individual images corresponding to the current location of the mobile terminal, and
   select the selected image from the sequence of individual images based on a selection command.

4. The mobile terminal of claim 1,
   wherein information about the current location of the mobile terminal includes information comparing the current location of the mobile terminal to a location related to the selected image.

5. The mobile terminal of claim 4, wherein the information comparing the current location of the mobile terminal to the location related to the selected image includes one of a distance and direction between the current location of the mobile terminal and a location where the selected image was captured.

6. The mobile terminal of claim 1,
   wherein information about the current location of the mobile terminal includes information comparing the first capturing direction to the current capturing direction.

7. The mobile terminal of claim 1,
   wherein the display unit comprises a single display unit, and
   wherein the selected image and the preview image are simultaneously displayed on separate regions of the single display unit.

8. The mobile terminal of claim 1, wherein the image corresponding to the preview image is automatically captured based on a location match between the selected image and the preview image, and a match of a size, a resolution, a brightness, a chroma, a focus, a bit depth and a color profile between the selected image and the preview image.

9. An image capture method of a mobile terminal, the method comprising:
   detecting, by the mobile terminal, a current location of the mobile terminal;
   detecting, by the mobile terminal, a current capturing direction of the camera;
   requesting, by the mobile terminal, based on the detected current location and the detected current capturing direction, images previously captured on the detected current location and the detected current direction of the mobile terminal from a server through a wireless communication unit when an input requesting the images is received through an input unit;
   receiving, by the mobile terminal from the server through the wireless communication unit, the requested images,
   dividing a display region of a display unit into first and second display regions when the requested images are received from the server;
   selecting one of the received requested images;
   displaying the selected image on the divided first display region;

displaying, on the divided second display region, a preview image being captured at the detected current location and the detected current capturing direction by a camera when the selected image is displayed on the divided first display region;

displaying a first capturing direction of the selected image on the divided first display region;

displaying the current capturing direction of the camera on the divided second display region;

displaying the current location of the mobile terminal on the divided first display region and the divided second display region if a capturing location of the selected image matches the current location of the mobile terminal; and automatically capturing an image corresponding to the preview image when the first capturing direction and the capturing location match the current capturing direction and the current location of the mobile terminal.

10. The method of claim 9,
wherein the display unit includes a touch screen, and
wherein the input requesting the images comprises a touch to the touch screen.

11. The method of claim 9, further comprising:
displaying a sequence of individual images corresponding to the current location of the mobile terminal; and
selecting the selected image from the sequence of individual images based on a selection command.

12. The method of claim 9, wherein information about the current location of the mobile terminal includes information comparing the current location of the mobile terminal to a location related to the selected image.

13. The method of claim 12, wherein the information comparing the current location of the mobile terminal to the location related to the selected image includes one of a distance and direction between the current location of the mobile terminal and a location where the selected image was captured.

14. The method of claim 9,
wherein information about the current location of the mobile terminal includes information comparing the first capturing direction to the current capturing direction.

15. The method of claim 9,
wherein the display unit comprises a single display unit, and
wherein the selected image and the preview image are simultaneously displayed on separate regions of the single display unit.

16. The method of claim 9, wherein the image corresponding to the preview image is automatically captured based on a location match between the selected image and the preview image, and a match of a size, a resolution, a brightness, a chroma, a focus, a bit depth and a color profile between the selected image and the preview image.

* * * * *